United States Patent
Horchler et al.

(10) Patent No.: US 12,491,284 B2
(45) Date of Patent: Dec. 9, 2025

(54) ANTISEPTIC WOUND DRESSING

(71) Applicant: HAWEST RESEARCH AG, Steinhausen (CH)

(72) Inventors: Harald K. Horchler, Wiehl (DE); Hans-Juergen Buschmann, Kempen (DE)

(73) Assignee: HAWEST RESEARCH AG, Steinhausen (CH)

( * ) Notice: Subject to any disclaimer, the term of this patent is extended or adjusted under 35 U.S.C. 154(b) by 426 days.

(21) Appl. No.: 18/062,678

(22) Filed: Dec. 7, 2022

(65) Prior Publication Data

US 2023/0096579 A1    Mar. 30, 2023

Related U.S. Application Data

(63) Continuation of application No. 14/888,259, filed as application No. PCT/EP2013/054132 on Mar. 1, 2013, now abandoned.

(30) Foreign Application Priority Data

Mar. 2, 2012 (DE) ................. 10 2012 004 024.5

(51) Int. Cl.
*A61L 15/28* (2006.01)
*A61L 15/20* (2006.01)
*A61L 15/42* (2006.01)
*A61L 15/44* (2006.01)
*A61L 15/46* (2006.01)

(52) U.S. Cl.
CPC .............. *A61L 15/28* (2013.01); *A61L 15/20* (2013.01); *A61L 15/425* (2013.01); *A61L 15/44* (2013.01); *A61L 15/46* (2013.01); *A61L 2300/206* (2013.01); *A61L 2300/23* (2013.01); *A61L 2300/404* (2013.01); *A61L 2300/802* (2013.01)

(58) Field of Classification Search
CPC ........ A61L 15/28; A61L 15/20; A61L 15/425; A61L 15/44; A61L 15/46; A61L 2300/206; A61L 2300/23; A61L 2300/404; A61L 2300/802; C08L 5/16
See application file for complete search history.

(56) References Cited

U.S. PATENT DOCUMENTS

| | | | |
|---|---|---|---|
| 5,728,823 A * | 3/1998 | Reuscher | B01D 69/141 536/46 |
| 6,689,378 B1 | 2/2004 | Sun et al. | |
| 7,604,816 B2 | 10/2009 | Hiltner et al. | |
| 2004/0031107 A1 | 2/2004 | Pegelow et al. | |
| 2007/0207189 A1 | 9/2007 | Belcheva et al. | |

FOREIGN PATENT DOCUMENTS

| | | | | |
|---|---|---|---|---|
| DE | 10356095 A1 * | 6/2005 | .......... | D06M 13/005 |
| DE | 10 2004 008913 A1 | 9/2005 | | |

OTHER PUBLICATIONS

Machine Translation for DE10356095A1; Dierk et al.; published Jun. 30, 2005.*
PubChem Entry for Chitosan CID 71853; downloaded Jul. 16, 2025.*
Tocopharm MCTBCD product ddata sheet (Cas No. 187820-08-2); downloaded Jul. 16, 2025.*
International Search Report of PCT/EP2013/054132, mailed May 2, 2013.
Oppermann et al., Mikrobiologischer Schnelltest zur Beurteilung antimikrobieller Textilien: TTC-Test, pp. 16, 19-21.
Buschmann et al., Hochveredlung von Baumwolle in Anwesenheit von Cyclodextinen zur Einlagerung von Duflstoffen, Melliand Textilberichte 72, 1991, pp. 98-199.
Altman FP, Tetrazolium salts and formazans; Prog Histochem Cytochem, 1976; http://www.ncbi.nlm.nih.gov/pubmed/792958.
Knittel et al.; Exog. Dermatol; (2003); 2:11; pp. 11-16.
Fouda, Moustafa Mohamed Gaballa; Dissertation: "Use of Natural Polysaccharides in Medical Textile Applications"; published (date of oral presentation/examination): Sep. 5, 2005.
Martel et al.; Eur. Polym. J.; vol. 31, No. 11, pp. 1083-1088 (1995).

* cited by examiner

*Primary Examiner* — Jeffrey T. Palenik
(74) *Attorney, Agent, or Firm* — Collard & Roe, P.C.

(57) ABSTRACT

The invention relates to an antiseptic material, in particular as a wound dressing, containing a carrier material and at least one antiseptic together with a surfactant, wherein the carrier material is equipped with a cyclodextrin or cyclodextrin derivative that is loaded in the antiseptic or antiseptics.

11 Claims, 1 Drawing Sheet

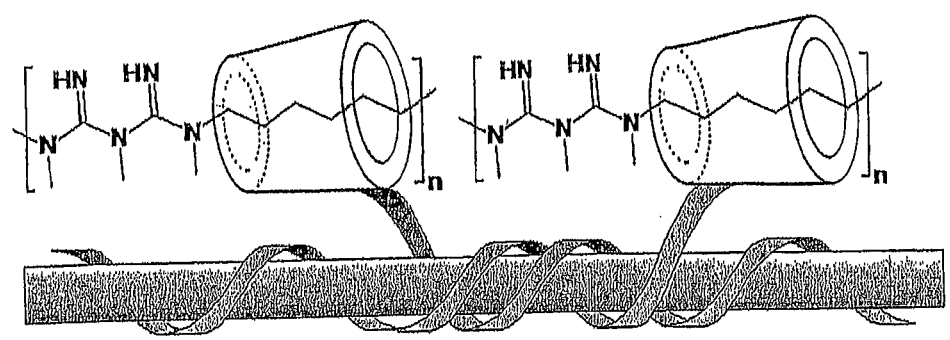

ANTISEPTIC WOUND DRESSING

CROSS REFERENCE TO RELATED APPLICATIONS

This application is a Continuation Application of U.S. patent application Ser. No. 14/888,2589 filed on Dec. 22, 2015 which is the National Stage of PCT/EP2013/054132 filed on Mar. 1, 2013 which claims priority under 35 U.S.C. 119 of DE 10 2012 004 024.5 filed on Mar. 2, 2012, the disclosure of which is incorporated by reference.

BACKGROUND

The invention relates to an antiseptic material, which in particular can also be used for wound dressings. It contains a carrier material and one or more antiseptics and a surfactant.

Antiseptically finished materials for the clinical area, especially for wound care, but also for cosmetic and other purposes, are widely known and in use. Such materials consist as a rule of a carrier material, which is finished with one or more antiseptics. Both textile materials and non-textile materials, such as polymer films and foams, come into question as carrier material.

Especially in the area of health care and wound management, antiseptics based on polyamines and biguanides have proved themselves. For example, chlorhexidine, polyethylenimine (Lupasol®), spermine, triethylenetetramine or also polyhexanide (PHMB, poly(hexamethylene biguanide) hydrochloride) may be mentioned. Chlorhexidine and PHMB in particular have a considerable antibacterial potential, wherein PHMB generally exerts a lower toxicity on human cells.

Particularly in the wound management, but also in the antibacterial finishing of textiles for health management and other purposes, the problem exists, however, that the antibacterial effect of the active substances is exhausted after relatively short time. Reason for this is the poor durability of the active substances on the textile materials. In the wound management, it additionally occurs that the active substances are diluted by the wound exudate and are removed (aspirated) together with the wound exudate. This makes a frequent change of the wound dressing necessary, which is not entirely conducive to the wound healing.

A particular problem exists in wounds that are filled with an absorbent material, closed and subjected to vacuum by means of a pump or suction bottle. It has been shown that a slight vacuum promotes the healing process. An impregnation of the absorbent material with an antiseptic would be advantageous here, but quite generally this is sucked out of the wound together with the exudate within entirely short time. As the consequence, the wound threatens to become infected unless a change of dressing is carried out regularly. However, a change of dressing is detrimental to the healing process. A prolongation of the useful life/duration of action of the antiseptic finish of the wound dressing would be very desirable here.

Finally, an antiseptic finish of textiles for the health care or the infection protection, in which the finish remains active over longer time, would also be desirable.

In this context the task of the invention is the provision of an antiseptic material which retains its effectiveness over longer time but simultaneously acts less toxically on human and animal cells, is simple to manufacture and simple to handle.

SUMMARY

This task is accomplished with an antiseptic material of the type mentioned initially, in which the carrier material is finished with a cyclodextrin or cyclodextrin derivative, which is loaded with the antiseptic or with several antiseptics.

According to the invention, any material that is finished antiseptically in the described way is understood as antiseptic material. Such a material respectively has a carrier material, which contains an antiseptic and a surfactant. Textile materials in particular come into question as carrier material, wherein they may be woven textile fabrics or nonwovens. Plastics also come into question as carrier material, especially porous plastic foams, as find application in the medicine in the wound treatment, especially open-porous polyurethanes, which qualify as eminently body-friendly.

The term "textile materials" includes all types and forms of natural and synthetic fibers and textiles produced from them. Woven and nonwoven fabrics of cotton and polyester can be mentioned in particular.

Polyamines and biguanides in particular come into question as antiseptics, wherein the term "polyamine" includes both antiseptically acting multifunctional amines and also polymeric amines. Biguanides, including chlorhexidine and polyhexanide, are preferred.

The carrier materials used according to the invention are finished with a cyclodextrin or cyclodextrin derivative. The known $\alpha$-, $\beta$- and $\gamma$-cyclodextrin forms are understood as cyclodextrins, wherein they are cyclic sugar molecules with 6, 7 or 8 $\alpha$-D-glucose units. These cyclodextrins may be derivatized in the usual way. Furthermore, they may be provided with anchor groups known in and for themselves, via which a binding to a carrier material takes place. This binding may take place in chemical way, in physical way via interactions or else purely mechanically via so-called anchor groups, which interlock with the carrier material. A physical binding takes place, for example, via electrostatic interactions or via chemical interactions between the molecule or its derivative, for example hydrophilic/hydrophobic interactions of the cyclodextrin with the surroundings and the surface of the carrier material. All of these methods are adequately described in the literature.

By cyclodextrin derivatives, derivatives of the $\alpha$-, $\beta$- and $\gamma$-cyclodextrins are known that in addition to an anchor group have a further functionalization in order to achieve desired effects. Such derivatives are to be selected such that they exert not any negative but if necessary a positive influence on the complex formation of the cyclodextrin with the antiseptic.

Common surfactants come into question as surfactants, but especially betaines. Especially undecylenic amidopropyl betaine and trimethylammonium acetate would have to be mentioned here. As a rule the surfactants are bound not to the cyclodextrin but instead via electrostatic interactions to the carrier material.

DETAILED DESCRIPTION

The carrier material coming into use according to the invention as a rule contains 1 to 5 wt % cyclodextrin or derivative thereof, especially 3 wt %, relative to the weight of the carrier material. Investigations have shown that, with proper process control, almost all cyclodextrin units are loaded in the usual case with one molecule of the antiseptic, i.e. the ratio of the cyclodextrin molecules to the molecules of the antiseptic lies in the range of 0.1 to 1.0. Where the surfactant or betaine is concerned, as a rule it is contained in the antiseptic material approximately in the same amount as the antiseptic.

Investigations have shown that the antiseptic material according to the invention has a high bactericidal activity and in addition is antivirally and fungicidally active. The fungicidal activity is obtained above all by the addition of the betaine, which is capable of detaching biofilms from wound surfaces and of promoting the penetration of the antiseptic into the wound. It exerts a kind of entrainment effect. Tests with pathogenic germs, especially of *S. aureus*, *E. coli* and *C. albicans*, have achieved a practically 100% inhibition of the microorganism in a short time.

In addition, cyclodextrins are suitable for assimilating protein substances and other decomposition products of body cells and of removing them from the surroundings. A healing-promoting and simultaneously also odor-reducing effect is derived from this. The wound is kept cleaner on the whole. Associated with the assimilation of such decomposition products is the release of antiseptics, which are contained in the cyclodextrin and which in this way are delivered gradually into the wound region. This is responsible for the lasting effect of the antiseptic materials according to the invention.

The antiseptic materials according to the invention may be used for a multiplicity of purposes. This is especially the use in conjunction with the wound care as wound dressing, bandage material or plasters. Foams may be used for the filling of wounds in the course of a vacuum therapy. Furthermore, in the clinical area, everyday textiles for health care, such as bed linens, gowns, patient clothing and the like, may be finished accordingly. A further application is that in cosmetic patches, and also for work garments outside hospitals in areas in which contamination with microorganisms cannot be ruled out. Finally, such a finish may also be used for the surface treatment of garments that are used for the protection of the transmission of bacteria and viruses and, for example, is specified for Mecca pilgrims. Everyday textiles may be reloaded after the laundering.

Particularly preferred antiseptic materials have a carrier material that is finished with β-cyclodextrin that is loaded with polyhexanide. Undecylenic amidopropyl betaine is present as the betaine. This cyclodextrin is bound via an anchor group to a polysaccharide, which will be applied onto the carrier material. In particular, common gel-forming polysaccharides come into question as the polysaccharide, such as carrageenan, tragacanth, guar, fucoidan or alginate. The binding of the cyclodextrin takes place by reaction of monochlorotriazinyl-β-cyclodextrin in water at an elevated temperature (90° C.) in the presence of sodium hydroxide solution at a pH of 11 to 12. The product so obtained, in which the β-cyclodextrin is bound to the polysaccharide, may be applied durably onto the carrier material by spraying or padding. It remains there even after several launderings.

The loading of the cyclodextrin with the antiseptic takes place by immersing the carrier material in a solution of the antiseptic, by spraying the antiseptic or by reacting the monochlorotriazinyl-β-cyclodextrin with the polysaccharide in the presence of the antiseptic. In the latter case, it must be ensured that undesired side reactions do not occur.

A further preferred form of the binding of the cyclodextrin to the carrier material may be achieved via polyvinylamine or polyethylenimine. β-Cyclodextrin-substituted polyvinylamine or polyethylenimine adheres excellently to the surface of textiles, but also of polyurethane foams, which is why correspondingly finished carrier material is also suitable in particular for wound treatment, but also for garments.

Accordingly, the invention also relates to an aqueous solution, which contains a cyclodextrin bound to a polyvinylamine or polyethylenimine, which is loaded with polyhexanide and additionally contains undecylenic amidopropyl betaine.

Tests have shown that a carrier material that is finished with 3% polyvinylamine-β-cyclodextrin and is loaded with approximately equal amounts of PHMB and undecylenic amidopropyl betaine, hereinafter referred to as the PHMB/betaine complex or complex, has a series of advantageous properties:

The PHMB/betaine complex has cationic properties and binds excellently to OH bonds, such as are present in cellulose, for example. An aqueous solution of the correspondingly loaded polyvinylamine-β-cyclodextrin complex may be used appropriately for decontamination and prevention of infection.

The complex exhibits a very good biocompatibility index with a high "killing rate" for microorganisms and a low toxicity toward human cells (tested on HaCaT cells). An accelerated wound healing and a very low infection rate have been shown.

The complex is capable of stabilizing the pH environment of a wound at 5.5 and thus of creating prerequisites for the wound conditioning. In chronic wounds, the pH is regularly in the alkaline range. At pH 5.5, the wound healing proceeds much faster.

The combination of PHMB and betaine dissolves biofilms and thus cleans the wound. It creates an optimal wound environment for faster regeneration of granulation tissue.

The complex durably inhibits free radicals, which are capable of damaging cells.

The complex is capable of absorbing exudate, especially proteins, from the wound and neutralizing it. In this way microorganisms are deprived of the nutritional basis.

EXAMPLES

The invention will be described in more detail by the following examples.

The solutions prepared in the following examples are suitable for the spraying of textile materials, foams, etc. of the most diverse materials, such as, for example, polyester, cotton, polyacrylonitrile, glass fibers, polyurethane, etc. The fixation of the cyclodextrin derivatives takes place by electrostatic and hydrophobic interactions with the respective surface.

It is not permissible to exceed the cited concentrations substantially, since otherwise intensive gel formation sets in and reaction solution can no longer be sprayed onto textile materials.

Example 1

Reaction with Carrageenan (Fluka)

1 g Carrageenan is dissolved together with 2 g monochlorotriazinyl-β-cyclodextrin (Wacker) in 200 mL water. The solution is heated to 90° C. and a solution of sodium hydroxide (15 g/L) is slowly added dropwise until a pH of 11 to 12 is established. After one hour, the solution is cooled and neutralized with hydrochloric acid.

Corresponding cyclodextrin derivatives were prepared with the following polysaccharides:
Tragacanth (Merck)
Guar (Sigma)
Fucoidan (Sigma)
Carrageenan/Fucoidan The cyclodextrin derivatives synthesized in this example do not have any kind of biostatic effects. The biostatic action of the finish can be determined by means of the formazan test (F. P. Altman, Progr. Histochem. Cytochem. 9 (1976); W. Oppermann, R. Gutmann, S. Schmitt, E. Held-Föhn, Textilveredelung 37, 19 (2003)).

In order to prepare cyclodextrin derivatives with both protein-adsorptive and biostatic properties, the following cyclodextrin derivatives were synthesized.
Reaction with Guar and Triethylenetetramine (Fluka)

1 g guar is dissolved together with two 2 g monochlorotriazinyl-β-cyclodextrin in 200 mL water. The solution is heated to 90° C. and a solution of triethylenetetramine (1 g/L) is slowly added dropwise until a pH of 11 to 12 is established. After one hour, the solution is cooled and neutralized with hydrochloric acid.

After the spraying of the solution onto a woven polyester fabric, this is dried at room temperature. An inhibition of the growth of 80% is measured by means of the formazan test.

Correspondingly, further protein-adsorptive cyclodextrin derivatives with biostatic properties were prepared:
Water-soluble starch/polyethylenimine (Lupasol®, BASF), inhibition 53%
Tragacanth/triethylenetetramine, inhibition 82%
Carrageenan/triethylenetetramine, inhibition 0%
Carrageenan/spermine (Fluka), inhibition 10%
Guar/diethylenetriamine (Fluka), inhibition 20%
Guar/1,2-diaminopropane (Fluka), inhibition 34%

Example 3

Examples of the Finishing of Textile Materials

A) The solutions prepared in Examples 1 and 2 are sprayed onto a woven fabric of cotton and dried at elevated temperature (40 to 80° C.). The cyclodextrins on the woven fabric surface can be detected in each sample by means of a basic phenolphthalein solution. If one drop of this violet solution is placed on the woven cotton fabric, then a decolorization takes place due to the complex formation between the cyclodextrin and the phenolphthalein.

For the detection of the protein binding, commercial protein powder is used. After an immersion in the protein solution, for several minutes, of the samples, which had been sprayed with the solutions prepared in Examples 1 and 2 and dried, the textile is carefully rinsed off with distilled water. Thereafter the textile samples are immersed in dilute aqueous sodium hydroxide solution and a couple of drops of copper sulfate solution are added. A staining of the samples is observed, which may be attributed to the presence of proteins.

B) The solutions prepared in Examples 1 and 2 are sprayed onto a woven fabric of polyester and dried. The detection of the presence of cyclodextrin and the binding of protein powder were performed correspondingly and yielded analogous results.

C) Instead of woven fabrics of cotton and polyester, woven fabrics of polyacrylonitrile, other synthetic and regenerative fibrous materials, foams of polyurethanes and the like are also suitable. The procedure corresponds to that described under A), the results correspond to the results obtained there.

Example 4

Cyclodextrin Derivatives with Reactive Anchor Groups

Suitable cyclodextrin derivatives are described in the corresponding patent literature. The preparation of monochlorotriazine-substituted β-cyclodextrin is known from DE 44 29 229 and of further cyclodextrin derivatives with one or more reactive anchor groups from DE 101 55 781.

A binding of cyclodextrin to fibrous materials is also possible by the use of bifunctional or polyfunctional reagents, such as via diisocyanates and the like (W. Volz, Anti-Smell Finishes in Textile Processing, Textilveredelung 38, 17 (2003)), or by the use of dimethylureas and similar compounds, such as are also used for crease-resistant finishing of cellulosic materials (H.-J. Burschmann, D. Knittel, E. Schollmeyer: Crease-resistant finishing of cotton in the presence of cyclodextrins for incorporation of fragrances, Melliand Textilber. 72, 198 (1991)).

Example 5

Finishing of Textile Materials with Cyclodextrin and Antiseptics

Especially chlorhexidine and polyhexanide in aqueous solution are used as antiseptics.

Three finishing variants with cyclodextrin derivatives, which are bound to the textile by ionic or hydrophobic interactions, are presented:

A) The textile material or the foam is finished with cyclodextrins. For this purpose, an aqueous solution of a cyclodextrin derivative (see above) or an aqueous solution of a cyclodextrin substituted with polyvinylamine or polyethylenimine (approx. 3% cyclodextrin content) is sprayed onto the material to be finished. An aqueous solution of the antiseptic (0.08 to 0.22% PHMB; 0.1 to 0.15% betaine) is sprayed simultaneously, wherein both solutions must have a pH of 5 to 7, since otherwise the formation of a precipitate takes place.

B) The textile material or the foam is finished with cyclodextrins. For this purpose, an aqueous solution of a cyclodextrin derivative (see above) or an aqueous solution of a cyclodextrin substituted with polyvinylamine or polyethylenimine (approx. 3% cyclodextrin content) with a pH of 5 to 7 is sprayed onto the material to be finished and dried. Then an aqueous solution of the antiseptic (0.1% PHMB; 0.1% betaine) is sprayed. The application of both solutions may also be performed by means of a padding machine.

C) A mixture of the cyclodextrin derivative (see above) or of a cyclodextrin substituted with polyvinylamine or polyethylenimine and of the antiseptic is prepared in aqueous solution by mixing both components (equimolar, preferably 0.001 to 0.01 mol/L), wherein the aqueous phase must have a pH of 5 to 7, in order to prevent the formation of an insoluble precipitate. The resulting aqueous solution is sprayed onto the textile material or is applied onto the textile material or the foam by an application by means of a padding machine.

Example 6

Finishing Variant with a Cyclodextrin Derivative with a Reactive Group

A woven cotton fabric is immersed in an aqueous solution of monochlorotriazinyl-β-cyclodextrin (sodium salt, 20-100 g/L) (Cavasol® W7 MCT, Wacker-Chemie GmbH), which has been adjusted to a pH of 4 to 6 with acetic acid (60%). Then the fabric is quetched on a padding machine (liquor uptake approx. 70%). Thereafter the fabric is predried at 80° C. for 10 minutes and then fixed at 160° C. for 7 minutes. Then an aqueous solution of the antiseptic (0.1% PHMB) is sprayed on or applied by an application by means of a padding machine. At the same time or subsequently, the betaine is applied from aqueous solution (0.1% betaine).

The FIGURE schematically shows a cyclodextrin molecule with polyhexanide loading and an anchor group, which mechanically anchors the cyclodextrin onto a textile fiber.

Accordingly, while at least one embodiment of the present invention have been shown and described, it is to be understood that many changes and modifications may be made thereunto without departing from the spirit and scope of the invention as defined in the appended claims.

What is claimed is:

1. A process for making an antiseptic bandage for wounds, comprising the following steps:
    providing a carrier material comprising a bandage formed from a woven fabric, nonwoven fabric, or foam materials;
    quenching the carrier material in a padding machine;
    drying the carrier material at a temperature between 80-160 degrees, and
    applying a composite material to the carrier material, the composite material comprising:
    i) a β-cyclodextrin comprising a wt % that is between 1-5 wt % of the carrier material,
    ii) a polyethyleneimine, wherein the β-cyclodextrin is bound to the polyethyleneimine to form the composite material;
    applying at least one antiseptic to the carrier material wherein the molecular ratio of β-cyclodextrin to antiseptic lies in the range of 0.1 to 1.0;
    applying a surfactant to the carrier material, the surfactant comprising amidopropyl betaine;
    wherein,
    the β-cyclodextrin is loaded with the antiseptic;
    the composite material is applied to the carrier material via an aqueous solution of monochlorotriazinyl-β-cyclodextrin with a pH of between 4-6 with acetic acid; and
    the composite material is bound to the carrier material via physical binding.

2. The process as in claim 1, wherein the step of providing a carrier material comprises providing a textile carrier material comprising polyester or cotton.

3. The process as in claim 1, wherein the β-cyclodextrin is a polyvinyl amine-β-cyclodextrin which comprises 3 wt % of the carrier material.

4. The process as in claim 1, wherein the antiseptic is one from the group of polyamines and biguanides.

5. The process as in claim 1, wherein the cyclodextrin or cyclodextrin derivative is loaded with chlorhexidine or polyhexanide.

6. The process as in claim 1, wherein the betaine is undecylenic amidopropyl betaine.

7. The process as in claim 1, wherein the physical binding comprises electrostatic interactions.

8. The process as in claim 1, wherein the physical binding is formed from chemical interactions between the molecule or its derivative.

9. The process as in claim 1, wherein the chemical interactions are formed by hydrophilic interactions of the cyclodextrin with the surface of the carrier material.

10. The process as in claim 1, wherein the chemical interactions are formed by hydrophobic interactions of the cyclodextrin with the surface of the carrier material.

11. The wound dressing as in claim 1, wherein when the wound dressing is applied to a wound, it absorbs exudate and neutralizing it.

* * * * *